(12) United States Patent
Sankrithi et al.

(10) Patent No.: US 7,431,366 B2
(45) Date of Patent: Oct. 7, 2008

(54) CROSSOVER MOTOR VEHICLE WITH A CARGO BED

(75) Inventors: Mithra M. K. V. Sankrithi, Lake Forest Park, WA (US); Siva Usha Mithra Sankrithi, Lake Forest Park, WA (US)

(73) Assignee: RSV Invention Enterprises, Lake Forest Park, WA (US)

( * ) Notice: Subject to any disclaimer, the term of this patent is extended or adjusted under 35 U.S.C. 154(b) by 351 days.

(21) Appl. No.: 11/440,394

(22) Filed: May 25, 2006

(65) Prior Publication Data
US 2007/0273177 A1 Nov. 29, 2007

(51) Int. Cl.
*B62D 39/00* (2006.01)
(52) U.S. Cl. .............. 296/26.01; 296/26.03; 296/26.08; 296/26.09; 296/26.12; 296/26.13; 296/64; 296/67
(58) Field of Classification Search .............. 296/26.01, 296/26.03, 26.08, 26.09, 26.12, 26.13, 64, 296/67
See application file for complete search history.

(56) References Cited

U.S. PATENT DOCUMENTS

| | | | | |
|---|---|---|---|---|
| 6,669,261 B2 * | 12/2003 | Roberts et al. | ........... | 296/65.09 |
| 2004/0245794 A1 * | 12/2004 | McManus et al. | ........ | 296/26.08 |
| 2007/0102947 A1 * | 5/2007 | Zhou | ........................ | 296/26.08 |

* cited by examiner

*Primary Examiner*—Lori L Lyjak

(57) ABSTRACT

The invention provides an innovative and practical new class of crossover motor vehicles for carrying passengers and for carrying cargo in a cargo or pickup bed, while still being of sufficiently small dimensions as to be garage-able in many home garages. Representative embodiments can carry 6 or 7 or 9 persons in comfortable seats all with adjacent or facing seats for companions; plus substantial varied cargos, which can potentially include sporting or recreational equipment such as bicycles or a powered waterscooter or snowmobile or motorcycle; camping gear including a 9-person tent; furniture such as a Queen bed set; appliances such as a washer and dryer; utility equipment such as a snowblower or riding lawn-mower; or substantial quantities of items such as lumber, bark or fertilizer.

40 Claims, 13 Drawing Sheets

CROSSOVER MOTOR VEHICLE WITH A CARGO BED

BACKGROUND OF THE INVENTION

Following the turn of the millennium, automotive vehicles of the "crossover" type have become more prevalent. These motor vehicles combine desirable attributes of at least two prior art vehicles, for instance a sport-utility-vehicle (SUV) and a pickup truck. A significant development in this class was pioneered in U.S. Pat. No. 6,065,798 for "Motor Vehicle Means for Carrying Passengers and Cargo."

BRIEF SUMMARY OF THE INVENTION

The present invention provides a further inventive development of crossover vehicles related to the class of vehicles of U.S. Pat. No. 6,065,798. The present invention provides a motor vehicle with a cargo bed between two facing-seat zones each of which have an outboard access door provided. The outboard access doors are unobstructed by rear wheelwells, which rear wheelwells are located aft of these outboard access doors. The invention provides a new class of crossover motor vehicles for carrying passengers and for carrying cargo in a cargo or pickup bed, while still being of sufficiently small dimensions as to be garage-able in many home garages. Typical preferred embodiments of the invention utilize high values of the ratio of wheelbase to overall vehicle length and location of rear wheels and tires close to the rear bumper end of the vehicle, to enable practical door access to all occupants within reasonable garage-able overall length, which occupants include occupants of a front row of seats including a driver, occupants of an optional second row of seats, and occupants of the aforementioned facing-seat zones near the aft end of the vehicle. Representative embodiments can carry 6 or 7 or 9 persons in comfortable seats all with adjacent or facing seats for companions so as to enable side-to-side or face-to-face conversations for all occupants; and can also carry substantial varied cargos, which can potentially include sporting or recreational equipment such as bicycles or a powered waterscooter; camping gear including a 9-person tent; furniture such as a Queen bed set; appliances such as a refrigerator or washer and dryer; or utility equipment such as a snowblower or riding lawnmower. A variant embodiment is also disclosed with means for retracting a facing-seat zone so as to widen the cargo bed when so desired by a user of the vehicle, and another variant embodiment is disclosed which is adaptable for camping purposes and uses. Further features are also specified and claimed.

DETAILED DESCRIPTION

Figure 1:
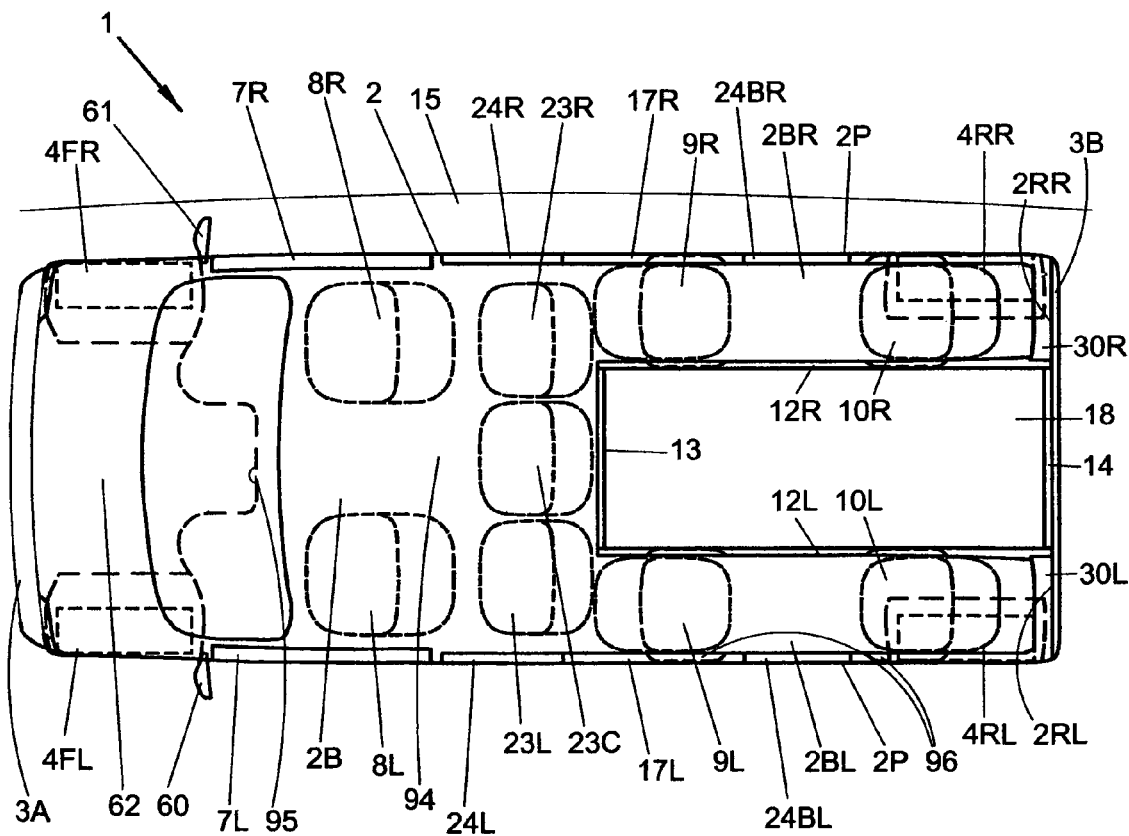
FIG. 1 illustrates a top or plan view of a representative 9 seat embodiment of the invention.

FIG. 1 illustrates a Vehicle With Cargo Bed Between Two Facing-Seat Zones, with a top or plan view of a representative 9 seat embodiment of the invention. While the illustrated vehicle has a forward cab section seating 5 persons, variants with a single row of 2 or 3 seats, or two rows with 4 or 6 seats are also clearly possible. Behind the left and right sides of the forward cab section, there are left and right zones with a pair of facing-seats each. Situated at least partially between the left and right facing-seat zones, a pickup bed or cargo bed is located, as illustrated. The preferred cargo-loading interface for the pickup bed is from the back, through use of a tailgate and/or tailgate extender and/or liftgate.

More specifically, FIG. 1 illustrates a motor vehicle 1 comprising: running gear means with four wheels and tires 4FL, 4FR, 4RL and 4RR for permitting said vehicle 1 to move and maneuver upon a road surface 15; a vehicle body 2 with a substantially enclosed compartment 2B surrounding a driver's seat 8L (or 8R in a variant embodiment in regions of the world with "right hand drive"), said compartment having a right extension 2BR extending rearwardly to a rear end of the right side 2RR of said body, said right extension having a right outer side wall 17R, a right rear wall 30R, and a right inner side wall 12R, said right inner side wall spaced inwardly of an outer perimeter 2P of the body, and said compartment having a left extension 2BL extending rearwardly to a rear end of the left side 2RL of said body, said left extension having a left outer side wall 17L, a left rear wall 30L, and a left inner side wall 12L, said left inner side wall spaced inwardly of an outer perimeter of the body 2P; a first pair of mutually facing seats 9R and 10R located at least in part in said right extension 2BR and a second pair of mutually facing seats 9L and 10L located at least in part in said left extension 2BL; a rear right wheel 4RR of said running gear means located at least in part below and behind the seat bottom of the aftmost of said first pair of mutually facing seats (10R); a rear left wheel 4RL of said running gear means located at least in part below and behind the seat bottom of the aftmost of said second pair of mutually facing seats (10L); a roof 94 extending over said enclosed compartment above the driver's seat and above said right extension 2BR and above said left extension 2BL; and a cargo bed 18 bounded at a forward edge by a rear wall 13 of said enclosed compartment 2B and at a first side edge by said right inner side wall 12R and at a second side edge by said left inner side wall 12L. The motor vehicle 1 further comprises a a left rearview mirror 60, a right rearview mirror 61, a front bumper 3A, a rear bumper 3B, and openable tailgate means 14 located at the aft end of said cargo bed, which in the illustrated embodiment is an open top cargo bed or pickup bed.

Figure 8A:
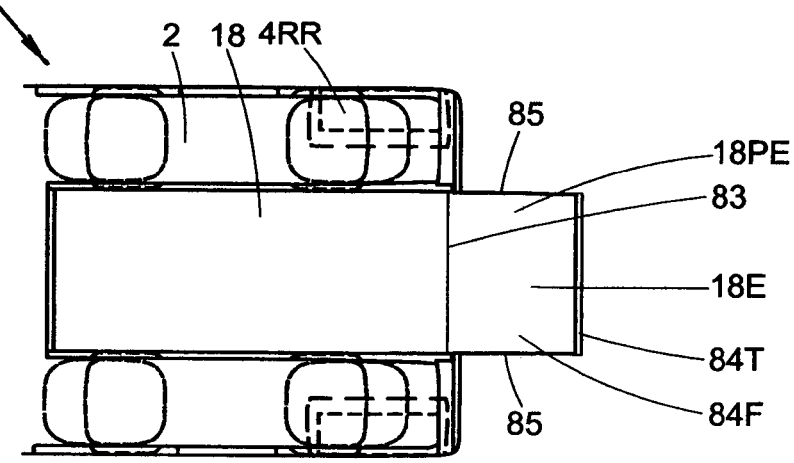
FIGS. 8A, 8B and 8C show plan-view partial illustrations of embodiments of the invention with cargo bed extenders.
Figure 8B:
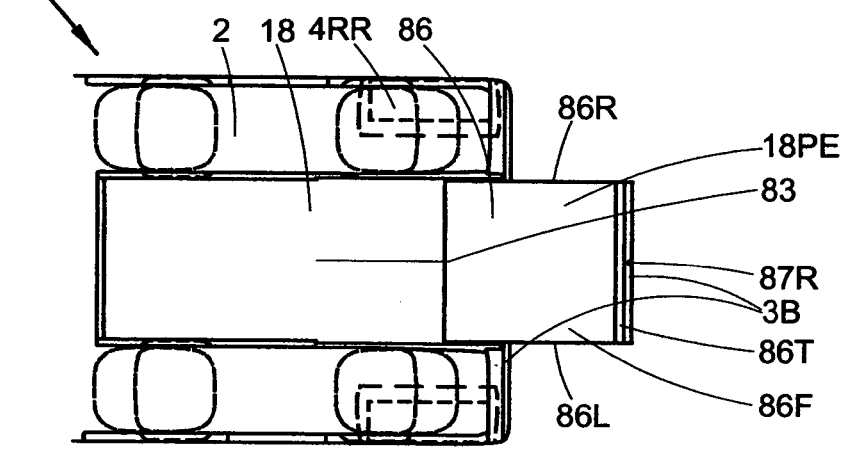

FIG. 1 further illustrates a motor vehicle 1 comprising: running gear means for permitting said vehicle to move and maneuver upon a road surface 15 which running gear means includes two front wheels and tires (4FL and 4FR) and two rear wheels and tires (4RL and 4RR); a vehicle body 2 with a substantially enclosed compartment 2B surrounding a driver's seat, said compartment having a right extension 2BR extending rearwardly to a rear end of the right side 2RR of said body, said right extension having a right outer side wall 17R, a right rear wall 30R, and a right inner side wall 12R, said right inner side wall spaced inwardly of an outer perimeter 2P of the body, and said compartment having a left extension 2BL extending rearwardly to a rear end of the left side 2RL of said body, said left extension having a left outer side wall 17L, a left rear wall 30L, and a left inner side wall 12L, said left inner side wall spaced inwardly of an outer perimeter 2P of the body; a right aftmost seat 10R located at least in part in said right extension 2BR and a left aftmost seat 10L located at least in part in said left extension 2BL; a right extension access door 24BR located in said right outer side wall 17R in major part forward of said right aftmost seat 10R, and a left extension access door 24BL located in said left outer side wall 17L in major part forward of said left aftmost seat 10L; wherein said rear wheels and tires (4RR and 4RL) of said running gear means are located at least in part below and behind the seat bottoms of said right aftmost seat 10R and said left aftmost seat 10L respectively, and wherein said rear wheels and tires (4RR and 4RL) are located with their aftmost ends located less than 1.4 tire diameter from the aftmost end of a rear bumper 3B of said motor vehicle 1 (not including a bumper element on an extended pickup bed for variant embodiments with a pickup bed extender deployed, as will be subsequently illustrated in FIG. 8B); a roof 94 extending over said enclosed compartment 2B above the driver's seat and above the right extension 2BR and above the left extension 2BL; and a cargo bed 18 bounded at a forward edge by a rear wall 13 of said enclosed compartment 2B and at one side edge by said right inner side wall 12R and at a second side edge by said left inner side wall 12L.

FIG. 1 further illustrates a motor vehicle 1 comprising: running gear means (illustrated with four wheels and tires 4FL, 4FR, 4RL and 4RR) for permitting said vehicle to move and maneuver upon a road surface 15; a vehicle body 2 with a substantially enclosed compartment 2B surrounding a driver's seat, said compartment having a side extension (2BR or 2BL) extending rearwardly to a rear end of one side (2RR or 2RL) of said body, said side extension having an outer side wall (17R or 17L), a rear wall (30R or 30L), and an inner side wall (12R or 12L), said inner side wall spaced inwardly of an outer perimeter 2P of the body; a pair of facing seats (either (9R and 10R) or (9L and 10L)) located at least in part in said side extension; a rear wheel (4RR or 4RL) of said running gear means located at least in part below and behind the seat bottom of the aftmost of said pair of facing seats (10R or 10L); a roof 94 extending over said enclosed compartment 2B above the driver's seat and above said side extension (2BR or 2BL); and a cargo bed 18 bounded at a forward edge by a rear wall 13 of said enclosed compartment and at one side edge by said inner side wall (12R or 12L).

The engine compartment 62 in this embodiment is located at the front of the motor vehicle 1, and the engine may drive the forward wheels and tires 4FL and 4FR, and/or the rear wheels and tires 4RL and 4RR, preferably through transmission means and drivetrain means for transmitting power from the engine to the drive wheels.

FIG. 1 illustrates a seating arrangement wherein said driver's seat 8L is on the left side of said substantially enclosed compartment 2B. FIG. 1 further illustrates a motor vehicle 1 wherein the substantially enclosed compartment 2B includes a first row of 2 forward facing seats including said driver's seat; and wherein the substantially enclosed compartment 2B also includes a second row of 3 forward facing seats 23R, 23C and 23L longitudinally located behind said driver's seat 8L.

The embodiment of FIG. 1 is shown with 3 pairs of doors, with 2 pairs of doors 7L & 7R and 24L & 24R for people to enter the first seat row and second seat row respectively in the forward cab zone of the enclosed compartment 2B, and with 1 more pair of doors 24BL & 24BR to provide entry into the left and right facing-seat zones in the left extension 2BL and in the right extension 2BR respectively. FIG. 1 thus illustrates motor vehicle 1, further comprising left and right forward door means 7L and 7R for permitting entry into and egress from said substantially enclosed compartment 2B for occupants of said driver's seat and of a forward passenger seat laterally disposed on the opposite side of said vehicle relative to said driver's seat.

FIG. 1 also shows in the motor vehicle 1, right and left second door means 24R and 24L for permitting entry into and egress from said substantially enclosed compartment 2B for occupants of a second row of seats 23R, 23C and 23L disposed in a row longitudinally located behind said driver's seat. The motor vehicle 1 will in a preferred embodiment have at least one seat located in said substantially enclosed compartment 2B and not located in the same seat row as said driver's seat 8L, which is equipped with LATCH means for securing a child seat thereon. For the illustrated embodiment, one or more or all of the second row seats 23C, 23R and 23L would be well suited to be LATCH (Lower Anchors and Tethers for Children) equipped. One or more of seats 9R, 10R, 9L and 10L could also optionally be LATCH equipped. Fold-out booster or child seats may also be optionally provided by the vehicle manufacturer at one or more LATCH-suitable seat locations.

In various embodiments various doors may be forward hinged, aft hinged, sliding doors, pitch-rotation upwardly-opening, sliding upward-opening or canopy/bi-fold canopy upward-opening doors. In an alternate embodiment a seating arrangement could exist wherein said driver's seat is on the right side of said substantially enclosed compartment 2B, corresponding to the forward right seat 8R instead of the forward left seat 8L in FIG. 1.

The illustrated motor vehicle 1 has a first pair of facing seats which comprise a forward-facing aftmost right seat 10R and an aft-facing second to aftmost right seat 9R. The illustrated motor vehicle 1 also has a second pair of facing seats which comprise a forward-facing aftmost left seat 10L and an aft-facing second to aftmost left seat 9L. To maximize usable space for the occupants of the facing seat compartments, armrests are shown integrated into the compartment sidewalls, preferably at the bottom sill level of sidewall windows. For example, an integrated armrest 96 is shown for the outboard side of forward-facing aftmost left seat 10L, and similarly for the outboard side of aft-facing second to aftmost left seat 9L. In preferred embodiments the seats 9R, 10R, 9L and 10L will preferably have seat-bottom widths of at least 17 inches or more preferably approximately 18.5 inches, to provide seating comfort equivalent to the most comfortable economy class seats provided in airliners.

The motor vehicle 1 further comprises right aft door means 24BR located in said right outer side wall 17R for permitting entry into and egress from said right extension 2BR for occupants of said first pair of facing seats; and left aft door means 24BL located in said left outer side wall 17L for permitting entry into and egress from said left extension 2BL for occupants of said second pair of facing seats. The right and left aft door means 24BR and 24BL may be fitted with integral windows which may optionally be openable, as well as appropriate means for door opening, closing and locking.

The motor vehicle 1 further comprises at least one of audio and video intercommunication means for at least two occupants seated in said enclosed compartment 2B including said right extension 2BR and said left extension 2BL, to at least one of aurally and visually communicate with one another.

The audio/video intercommunications means preferably includes an audio/video control element 95 that can be controlled by the driver or forward passenger of the vehicle, for turning the system on or off and optionally for selecting which seats the system is on for, and which seats the system is off or muted for. The audio/video intercommunications means may utilize an intercom system, a video intercom system, and/or a text intercom system. For each seat element, the user interface(s) may be mounted on an armrest, on the front end of the seat cushion support structure, on the back of a seat forward of the seat in question, or on a vehicle sidewall or pillar adjacent to the seat in question. For example, for the aft compartment seats 9R, 10R, 9L and 10L the user interface(s) could be at the forward end of each of the sidewall armrests 96 shown in FIG. 1.

The motor vehicle 1 could also include a variety of other features and amenities known from automotive prior art practice, including but not limited to displays and controls for the driver and passengers; gear-shift means for manual or automatic transmission controls; heating, ventilation and air-conditioning controls; storage compartments such as glove compartment and/or underseat stowage means; seat features such as armrests and headrests and seat adjustment means powered or nonpowered, including longitudinal and vertical location, recline, armrest, headrest and/or lumbar adjustments; entertainment features such as an audio system which may include a CD and DVD player and speakers and an optional video system; cupholders; openable doors and windows and tailgate; sunshades; sunroof or moonroof installations; decorative, color and texture elements; application of good industrial design to optimize both function and form; noise control elements including carpet and pad elements and noise insulation and/or active noise and vibration control elements; damage and injury inhibiting elements including seatbelts, shoulder belts and airbags as well as rollover, protective and/or crumple structure, body extension rigidifying structure, strong structure employing metallic or composite or hybrid material architectures, and pickup bed liner elements; aerodynamic elements such as spoiler or skirt elements; pickup bed feature elements such as tailgate, hook and fastener elements, and a forward end ladder to climb from the pickup bed to the roof; and engine, drivetrain, suspension, running gear, exhaust system, external and internal light systems, gas tank and filler pipe installation and fuel system, spare tire installation (e.g. under the pickup bed) and other mechanical & electrical and electronic system features either basic or optional. As one example of variant features the engine may be a 10, 8, 6, 5, or 4 cylinder spark-ignition or compression-ignition (i.e., diesel) engine with various cylinder layouts; a turbocharged internal combustion engine; a rotary engine such as a Wankel engine; a gas turbine engine; or a hybrid engine combining a combustion engine element and an electric motor element.

Figure 2:
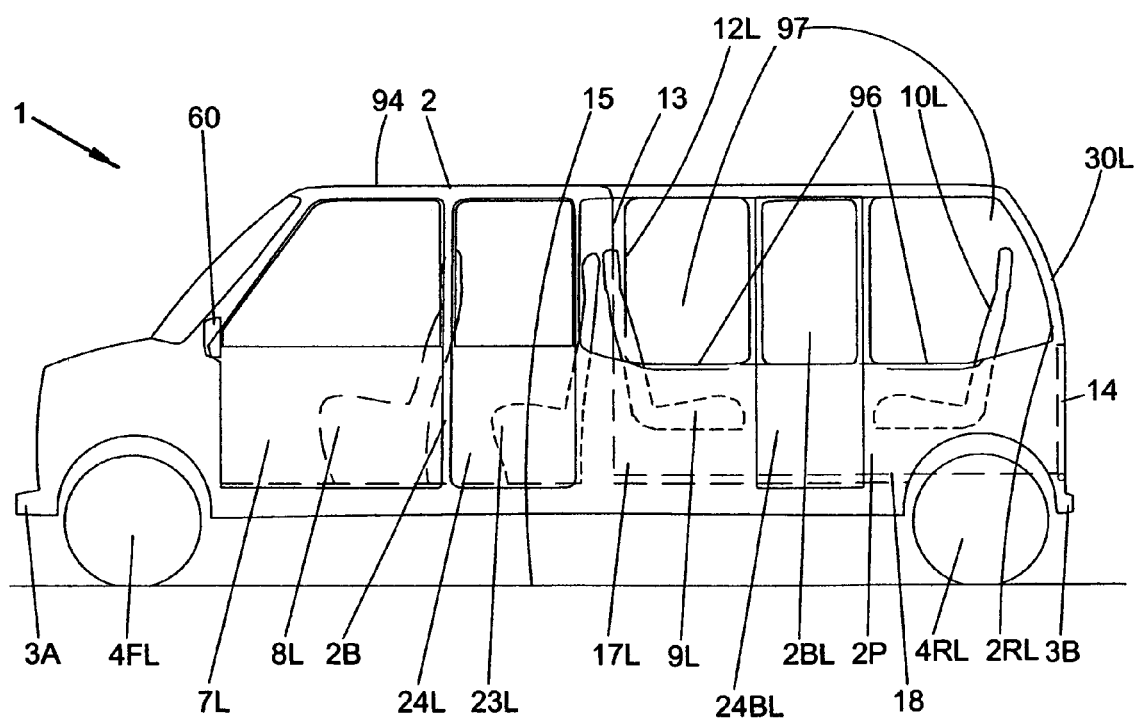
FIG. 2 illustrates a left side view of the embodiment of FIG. 1.

FIG. 2 illustrates a left side view of the embodiment of FIG. 1, with corresponding elements indicated by corresponding numerals. In this view, the motor vehicle 1 is seen to have outboard armrest surfaces 96 built into the lower sill surfaces of transparent window means 97 in the left extension 2BL, for occupants to rest their outboard-side arms. In a preferred embodiment, similar armrest surfaces built into lower sill surfaces will be provided for outboard and inboard sides of the left extension 2BL and the right extension 2BR. The illustrated doors 7L, 24L and 24BL may be forward or aft hinged or sliding doors in variant embodiments, and while the illustrated doors have near-vertical forward and aft edges, alternate embodiments could feature inclined forward and/or aft edges for some or all doors.

Figure 3:
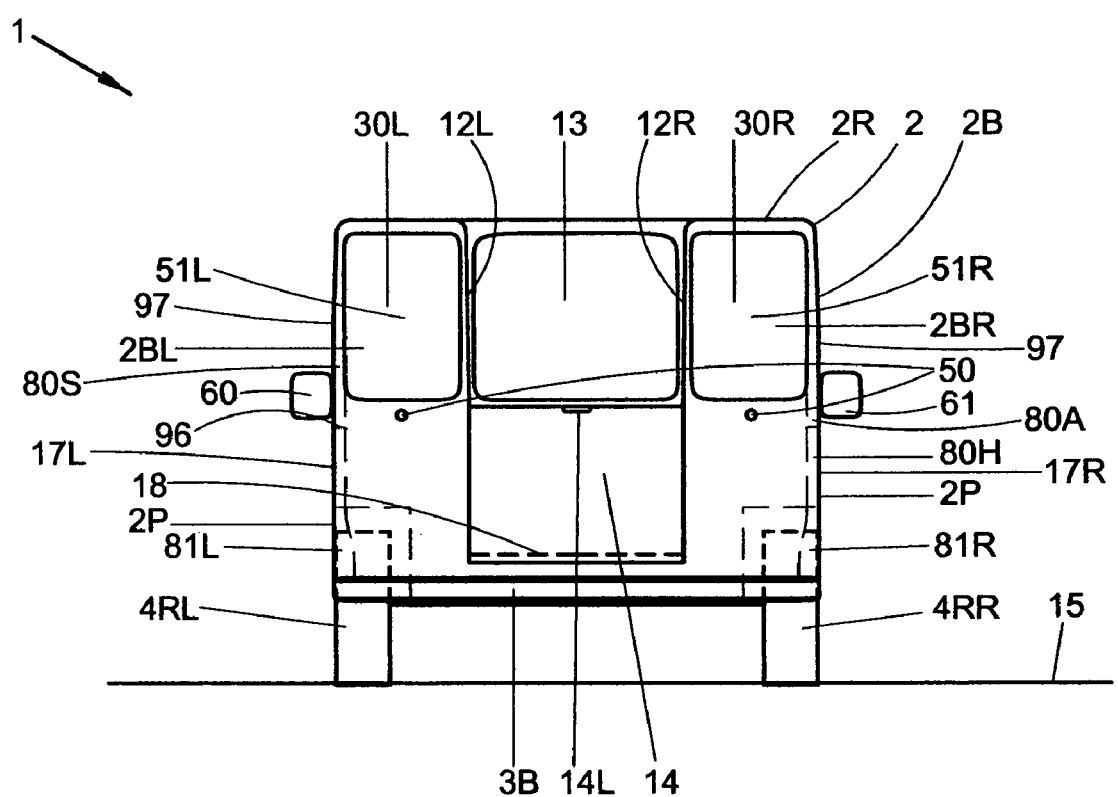
FIG. 3 illustrates a rear view of the embodiment of FIG. 1.

FIG. 3 illustrates a rear view of the embodiment of FIG. 1.

The motor vehicle 1 is illustrated wherein the right outer side wall 17R and left outer side wall 17L utilize thin but strong structure means in areas 80H, 80A and 80S adjacent to where the hips, arms and shoulders respectively of occupants of the first pair of facing seats (9R and 10R from FIG. 1) in the right extension 2BR and the second pair of facing seats (9L and 10L from FIG. 1) in the left extension 2BL are located. The thin but strong structure means serve as means for enabling wider seating comfort for the occupants (of seats 9R, 10R, 9L and 10L) given specified overall vehicle width and cargo bed width. Note that the thin but strong structure means at shoulder and possibly arm level, will be at least in part located in thin but strong pillar structure elements longitudinally interspersed between window elements on the outer sides of the motor vehicle 1.

The motor vehicle 1 is also shown wherein the right outer side wall 17R and left outer side wall 17L utilize strong structure means with lateral impact protection means 81R and 81L respectively, in areas in the vicinity of the vertical level corresponding to where the feet of occupants of said first pair and second pair of facing seats are located. Note that the lateral impact protection means may include rigid and/or crumple zone structural means for enhancing occupant protection in the event of a lateral impact accident to the vehicle.

FIG. 3 also illustrates motor vehicle 1 wherein the right outer side wall 17R and left outer side wall 17L utilize thin but strong and shatter-resistant transparent window means 97 in areas adjacent to where the shoulders of occupants of said first pair and second pair of facing seats are located.

Finally, FIG. 3 also illustrates motor vehicle 1, further comprising rear right hatch means 51R located in an upper substantially transparent window panel in the right upper part of said right rear wall 30R, for permitting goods to be loaded into said right extension behind said first pair of facing seats (9R and 10R); and further comprising rear left hatch means 51L located in an upper substantially transparent window panel in the left upper part of said left rear wall 30L, for permitting goods to be loaded into said left extension behind said second pair of facing seats (9L and 10L). Hatch opening means 50 for opening and optionally providing locking control for hatch means 51L and 51R, are also illustrated.

One major advantage of the vehicle configuration of FIGS. 1-3 is that it provides comfortable accommodation for up to 9 persons, similar to the largest sport-utility vehicles (SUVs), while also providing a long and practical pickup bed for a variety of cargos such as furniture, building supplies, appliances, sporting goods or vehicles, or other goods. The laterally central location of the pickup bed, and the availability of tall front and side walls for cargo bracing are also major advantages.

Further advantages of the vehicle of FIGS. 1-3 are evident from the features shown on the Figures themselves, and still further advantages will be documented as the invention is further specified herein. It should be noted that variations to the geometry and shape of the vehicle body are possible within the scope of the invention as claimed—e.g., the aft body upper closure may have a "square back" or "inclined hatchback" or "curve back" form, to cite just one example of many.

Figure 4:
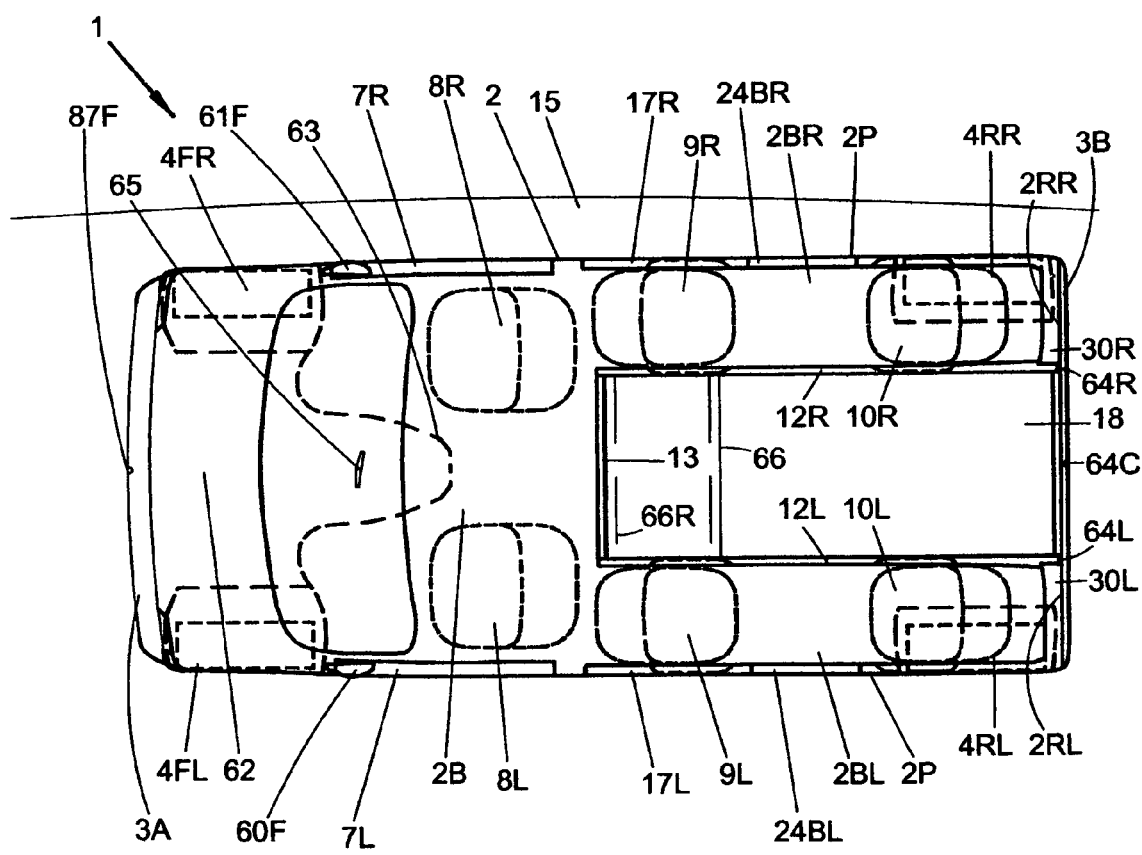
FIG. 4 illustrates a top or plan view of a representative 6 seat embodiment of the invention.

FIG. 4 illustrates a top or plan view of a representative 6 seat embodiment of the invention. This embodiment is similar to that of FIG. 1, but has a shorter length body 2, and eliminates the second row of seats 23L, 23C and 23R that were included in the embodiment of FIG. 1. This embodiment would be more appealing to customers with slightly smaller families and/or garages and/or budgets than the embodiment of FIG. 1!

FIG. 4 thus illustrates a motor vehicle 1 comprising: running gear means for permitting said vehicle to move and maneuver upon a road surface 15 which running gear means includes two front wheels and tires (4FL and 4FR) and two rear wheels and tires (4RL and 4RR); a vehicle body 2 with a substantially enclosed compartment 2B surrounding a driver's seat, said compartment having a right extension 2BR extending rearwardly to a rear end of the right side 2RR of said body, said right extension having a right outer side wall 17R, a right rear wall 30R, and a right inner side wall 12R, said right inner side wall spaced inwardly of an outer perimeter 2P of the body, and said compartment having a left extension 2BL extending rearwardly to a rear end of the left side 2RL of said body, said left extension having a left outer side wall 17L, a left rear wall 30L, and a left inner side wall 12L, said left inner side wall spaced inwardly of an outer perimeter 2P of the body; a right aftmost seat 10R located at least in part in said right extension 2BR and a left aftmost seat 10L located at least in part in said left extension 2BL; a right extension access door 24BR located in said right outer side wall 17R in major part forward of said right aftmost seat 10R, and a left extension access door 24BL located in said left outer side wall 17L in major part forward of said left aftmost seat 10L; wherein said rear wheels and tires (4RR and 4RL) of said running gear means are located at least in part below and behind the seat bottoms of said right aftmost seat 10R and said left aftmost seat 10L respectively, and wherein said rear wheels and tires (4RR and 4RL) are located with their aftmost ends located less than 1.4 tire diameter from the aftmost end of a rear bumper 3B of said motor vehicle 1; a roof 94 extending over said enclosed compartment 2B above the driver's seat and above the right extension 2BR and above the left extension 2BL; and a cargo bed 18 bounded at a forward edge by a rear wall 13 of said enclosed compartment 2B and at one side edge by said right inner side wall 12R and at a second side edge by said left inner side wall 12L.

FIG. 4 shows a motor vehicle 1, further comprising a forward-location engine compartment 62, wherein the engine compartment aft wall 63 moves aft into a zone substantially located laterally between the driver's seat 8L and a forward passenger seat 8R on the opposite side of the vehicle as the driver's seat. The engine compartment volume in this aft extension or zone could house the back end of a longitudinally oriented engine, and/or could house transmission and/or drivetrain components at least in part behind an engine.

The motor vehicle 1 of FIG. 4 further comprises aft facing video camera means such as one or more aft-facing video cameras 64L, 64C and/or 64R, with video display means 65 visible to a driver in the driver's seat 8L. Note that this video display would typically be to supplement internal and external conventional mirrors.

The embodiment of FIG. 4 shows a motor vehicle 1, further comprising a storage compartment 66 in the cargo bed 18. The illustrated storage compartment 66 forms an enclosed volume at the forward end of the cargo bed 18, bounded by a compartment top panel and compartment aft panel as shown, and on the bottom by the cargo bed's floor, on the front by the rear wall 13 of the enclosed compartment 2B, and on the right and left sides respectively by the right inner side wall 12R and left inner side wall 12L. Goods can be loaded into this compartment by door means imbedded in the compartment top panel and/or compartment aft panel, or by hinged or translating motion of the compartment top panel and/or compartment aft panel. Preferably, the design and construction of this storage compartment further comprises means for retracting the structure of said storage compartment to a configuration 66R occupying less space in said cargo bed, with the compartment top panel folded into a vertical orientation substantially adjacent to rear wall 13 and the compartment aft panel folded approximately flush with or parallel and close to the cargo bed floor.

FIG. 4 also illustrates a motor vehicle 1, further comprising driver-controllable foldable external mirror housing means 60F and 61F (shown in folded configuration) for enabling reduced vehicle overall width to facilitate parking in width-constrained locations. Note that electronic preset means may be provided to realign left and right external mirrors for different driver seat positions and driver statures, in addition to the mirror housing retraction means. Note also that the current vehicle could have representative width and height dimensions of about 82 inches wide with external mirror housings folded, and 80 inches tall, or similar numbers as to enable the vehicle to fit through most typical American garage doors and into typical American garages.

Finally, FIG. 4 also illustrates a motor vehicle 1, further comprising at least one of (i) front distance sensor means 87F (illustrated) for measuring clearance between a front bumper of the vehicle and the nearest object or obstacle it could hit upon further forward movement of said vehicle, and (ii) rear distance sensor means (not illustrated) for measuring clearance between a rear end of the vehicle and the nearest object or obstacle it could hit upon further aft movement of said vehicle.

Figure 5A:
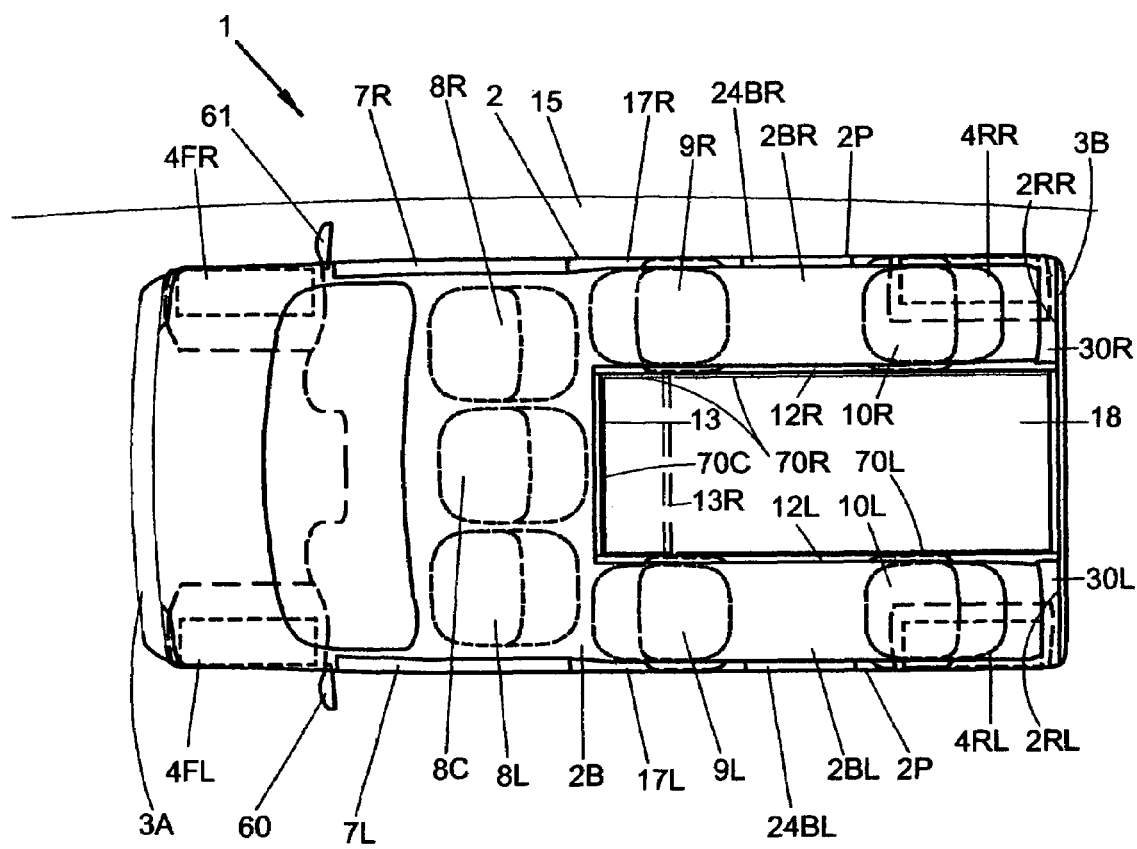
FIGS. 5A and 5B illustrate top or plan views of two representative 7 seat embodiments of the invention.
Figure 5B:
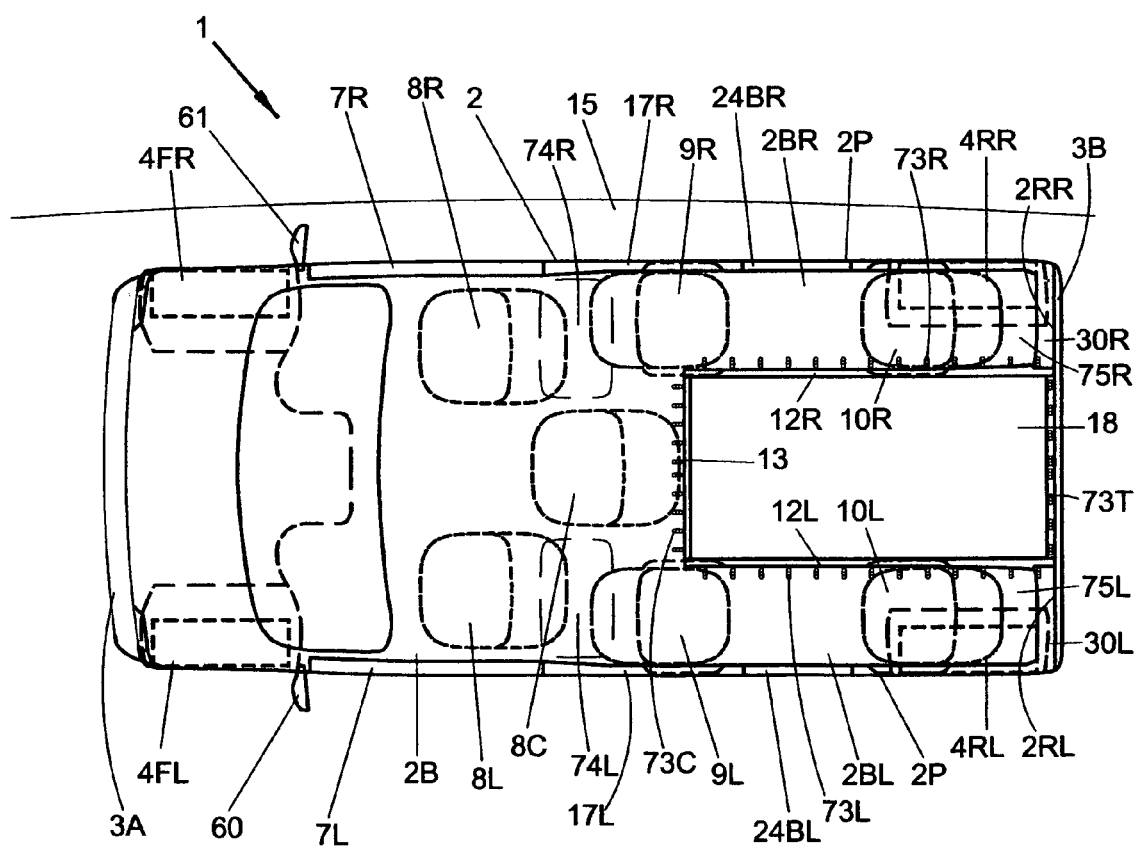

FIGS. 5A and 5B illustrate top or plan views of two representative 7 seat embodiments of the invention.

FIG. 5A shows a motor vehicle 1, wherein the substantially enclosed compartment 2B includes a first row of 3 forward facing seats 8L, 8C and 8R, including the driver's seat 8L in jurisdictions with left-hand drive (the driver's seat would be 8R in jurisdictions with right-hand drive).

The embodiment of FIG. 5A also shows the motor vehicle 1, further comprising deployable protective means 70R, 70L and 70C respectively for protecting the right inner side wall 12R and any window element therein, the left inner side wall 12L and any window element therein, and the rear wall 13 of the enclosed compartment and any window element therein, from surface damage by movement of cargo located on the cargo bed 18. Note that the deployable protective means may utilize one or more of wall top mounted roll-down sheets or nets or deployable protective panel elements or protective tarp fastening anchors.

The illustrated motor vehicle 1, further comprises means for longitudinally repositioning the rear wall 13 of the enclosed compartment 2B, for example to the aft-displaced position 13R, and for changing the length of the cargo bed 18 concurrently. This could be desirable, for example, to allow aft movement of seat 8C to a position where it can safely accommodate a child seat, without risk of inadvertent impact to the child seat by a forward seat row protecting airbag. This could also be desirable, for example, to provide greater legroom for an occupant of seat 8C.

FIG. 5B illustrates a motor vehicle 1, similar to that of FIG. 5A but with the center seat 8C shifted aft to enable it to have more legroom, as well as to accommodate a child seat without risk of inadvertent impact to the child seat by a forward seat row protecting airbag. The motor vehicle 1 further comprises at least one of cargo load securing means 73C located near the top end of the rear wall 13 of the enclosed compartment 2B and tailgate cargo load securing means 73T, for enabling securing of cargo loads on the cargo bed 18. Note that the cargo load securing means may include hook and/or eyelet elements, and optional reel-out tether elements.

The illustrated motor vehicle 1, further comprises cargo load securing means 73R located near the top end of the right inner side wall 12R of the enclosed compartment 2B, for enabling securing of an exemplary cargo load on the right side of the cargo bed 18; and further comprises cargo load securing means 73L located near the top end of the left inner side wall 12L of the enclosed compartment 2B, for enabling securing of an exemplary cargo load on the left side of the cargo bed 18. Note that the cargo load securing means may include hook and/or eyelet elements, and optional reel-out tether elements.

FIG. 5B also illustrates a motor vehicle 1, further comprising storage means 74R for storing items immediately forward of the aft-facing second to aftmost right seat 9R, below the level of the top of the seatback of the aft-facing second to aftmost right seat 9R; and further comprising storage means 74L for storing items immediately forward of the aft-facing second to aftmost left seat 9L, below the level of the top of the seatback of the aft-facing second to aftmost left seat 9L. The storage means may comprise a floor-mounted contoured storage compartment, similar to floor-mounted "doghouse" storage compartments used in the cabins of prior-art commercial jet airliners.

Finally, the embodiment of FIG. 5B illustrates a motor vehicle 1, further comprising storage means 75R for storing items immediately aft of the forward-facing aftmost right seat 10R, and further comprising storage means 75L for storing items immediately aft of the forward-facing aftmost left seat 10L. The storage means may comprise a floor-mounted storage with a reel-out privacy cover, similar to installations in prior-art automotive station wagons or hatchbacks.

Figure 6A:
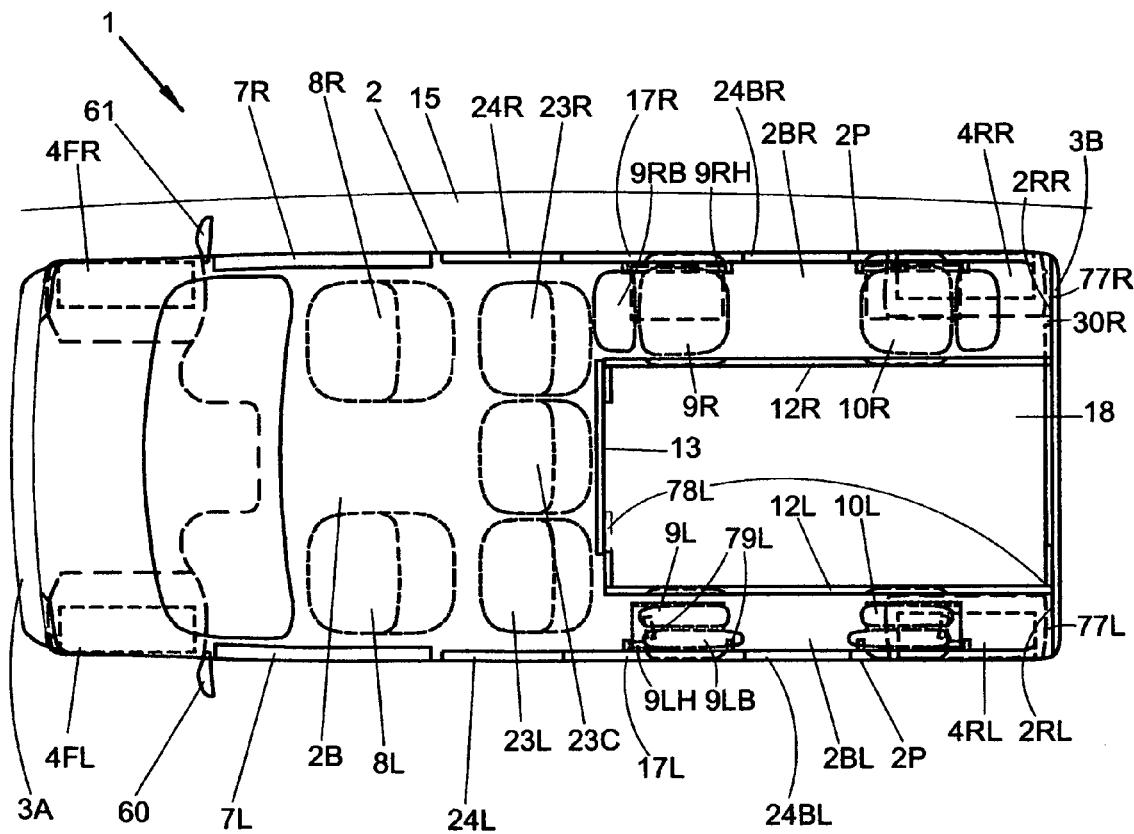
FIGS. 6A, 6B and 6C illustrate top or plan views of a variant 9 seat embodiment of the invention, with one or two facing-seat zones shown in a retracted configuration so enabling correspondingly wider cargo bed configurations.
Figure 6B:
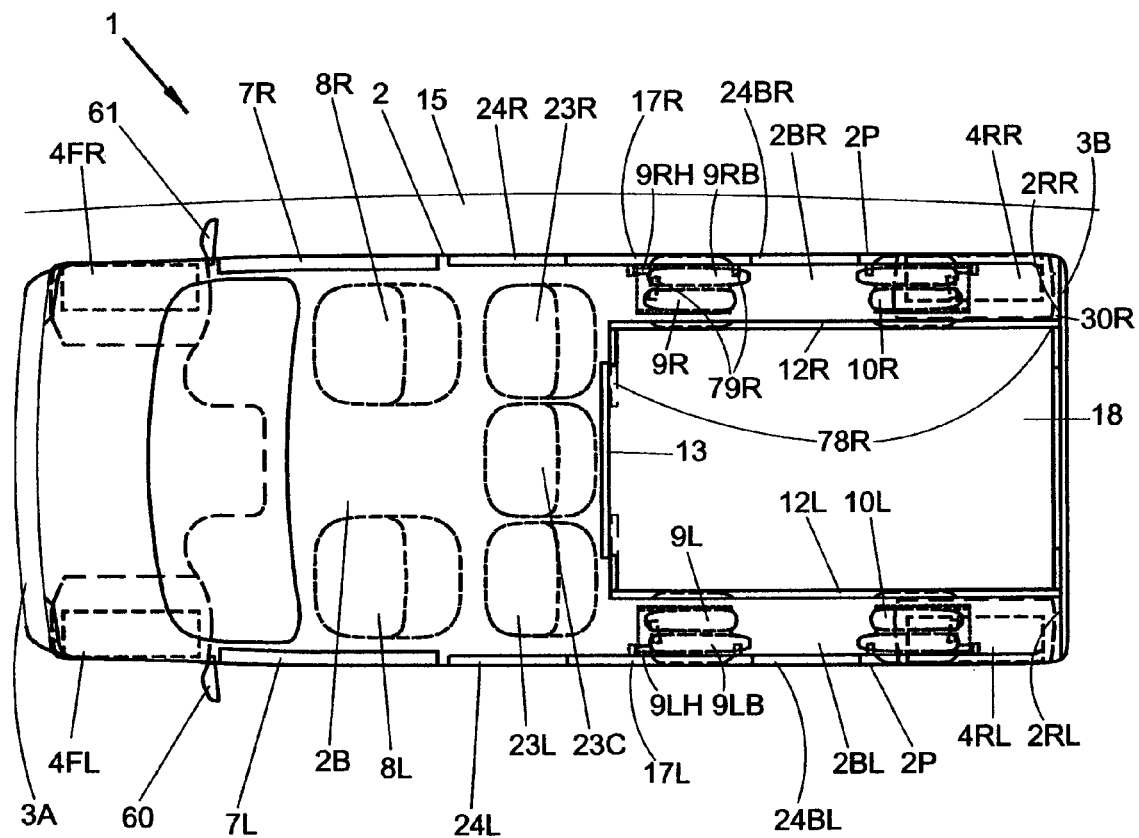
Figure 6C:
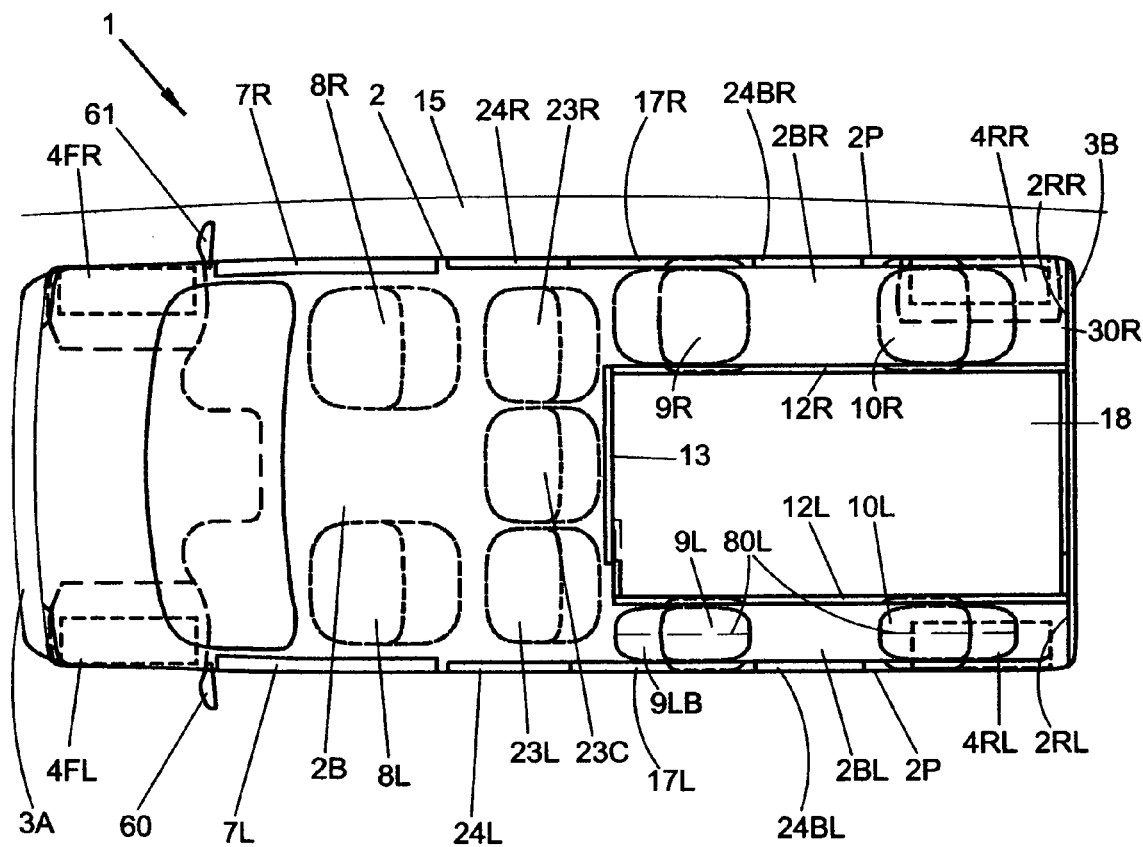

FIGS. 6A, 6B and 6C illustrate top or plan views of variant up-to-9 seat embodiments of the invention, with one or two facing-seat zones shown in retracted configuration to enable correspondingly wider cargo bed configurations for those times when the user desires to carry wider cargo loads but does not need the vehicle to carry 9 persons.

FIG. 6A illustrates a motor vehicle 1, further comprising rear right door means 77R located in the right rear wall 30R, for permitting goods to be loaded into the right extension 2BR behind the first pair of facing seats 9R and 10R. Similarly the motor vehicle 1 further comprises left door means 77L located in the left rear wall, for permitting goods to be loaded into the left extension 2BL behind the second pair of facing seats 9L and 10L; however left door means 77L is shown in a stowed configuration along with deployment of means 78L for laterally repositioning the left inner side wall 12L of the enclosed compartment 2B, and for changing the width of the cargo bed 18 concurrently. Means 78L for laterally repositioning the left inner side wall 12L may be automated and/or powered means or manual means, and may optionally employ track and roller elements. Also shown deployed are means 79L for folding the seat back and seat bottom elements of seat 9L (and preferably both of the second pair of facing seats 9L and 10L) to enable repositioning of said left inner side wall 12L to a further left location so as to enable an effectively wider cargo bed width when said second pair of facing seats need not be used for seating occupants. In the illustrated embodiment means 79L include manual or powered means for folding down seatback 9LB on seat 9L, then folding up the combined seat and seatback about hinge 9LH to a stowed more vertical orientation occupying less width, adjacent to the left outer side wall 17L. In an alternate embodiment the seat may stow against the inner side wall rather than the outer side wall. Note that sliding or folding panel interfaces with overlapping or butt interfaces and appropriate weatherseal means can be used at the front, top and aft sides of the left extension to keep the occupant compartment sealed and weatherproof in plural repositioned configurations. Some examples of similar mechanism means for reconfiguring an extension to a reduced width configuration, are included in U.S. Pat. No. 6,065,798. Note also that window elements may be incorporated in right door means 77R and in left door means 77L. While FIG. 6A shows a configuration with 7 seats and a somewhat wider cargo bed, with usable seats remaining in the right extension 2BR, an alternate configuration with 7 seats with usable seats remaining in the left extension 2BL rather than the right extension 2BR, is clearly possible.

FIG. 6B illustrates the embodiment of FIG. 6A, but with both the left extension 2BL and the right extension 2BR in retracted or stowed configurations, resulting in the vehicle having just 5 usable seats, but a much wider cargo bed 18. FIG. 6B illustrates a motor vehicle 1, further comprising means 78R (shown deployed) for laterally repositioning the right inner side wall 12R of the enclosed compartment 2B, and for changing the width of the cargo bed 18 concurrently. Means 78R for laterally repositioning the right inner side wall 12R may be automated and/or powered means or manual means, and may optionally employ track and roller elements. Also shown deployed are means 79R for folding the seat back and seat bottom elements of seat 9R (and preferably both of the first pair of facing seats 9R and 10R) to enable repositioning of said right inner side wall 12R to a further right location so as to enable an effectively wider cargo bed width when said first pair of facing seats need not be used for seating occupants. In the illustrated embodiment means 79R include manual or powered means for folding down seatback 9RB on seat 9R, then folding up the combined seat and seatback about hinge 9RH to a stowed more vertical orientation occupying less width, adjacent to the right outer side wall 17R. In an alternate embodiment the seat may stow against the inner side wall rather than the outer side wall. Note that sliding or folding panel interfaces with overlapping or butt interfaces and appropriate weatherseal means can be used at the front, top and aft sides of the right extension to keep the occupant compartment sealed and weatherproof in the various repositioned configurations.

FIG. 6C shows an embodiment with an extension retraction or stowage means on only one side of the vehicle; on the left side illustrated here but it could be on the right side in a variant embodiment. The motor vehicle 1, here is fitted with telescopic contracting member means 80L for reducing the effective width of the second pair of facing seats 9L and 10L to enable repositioning of the left inner side wall 12L to a further left location so as to enable an effectively wider cargo bed width when said second pair of facing seats need not be used for seating occupants. The telescopic contracting member means may include telescoping tubular elements (such as are known from the prior art) under the seat pan surface and/or behind the seat back surface in one preferred embodiment. The telescopic contracting member means may include scissor-jack-type expansion and contraction mechanisms under the seat pan surface and/or behind the seat back surface in another preferred embodiment. A mirror image variant of the illustrated embodiment would be fitted with telescopic contracting member means for reducing the effective width of the first pair of facing seats (9R, 10R) to enable repositioning of the right inner side wall to a further right location so as to enable an effectively wider cargo bed width when said first pair of facing seats need not be used for seating occupants.

Figure 7:
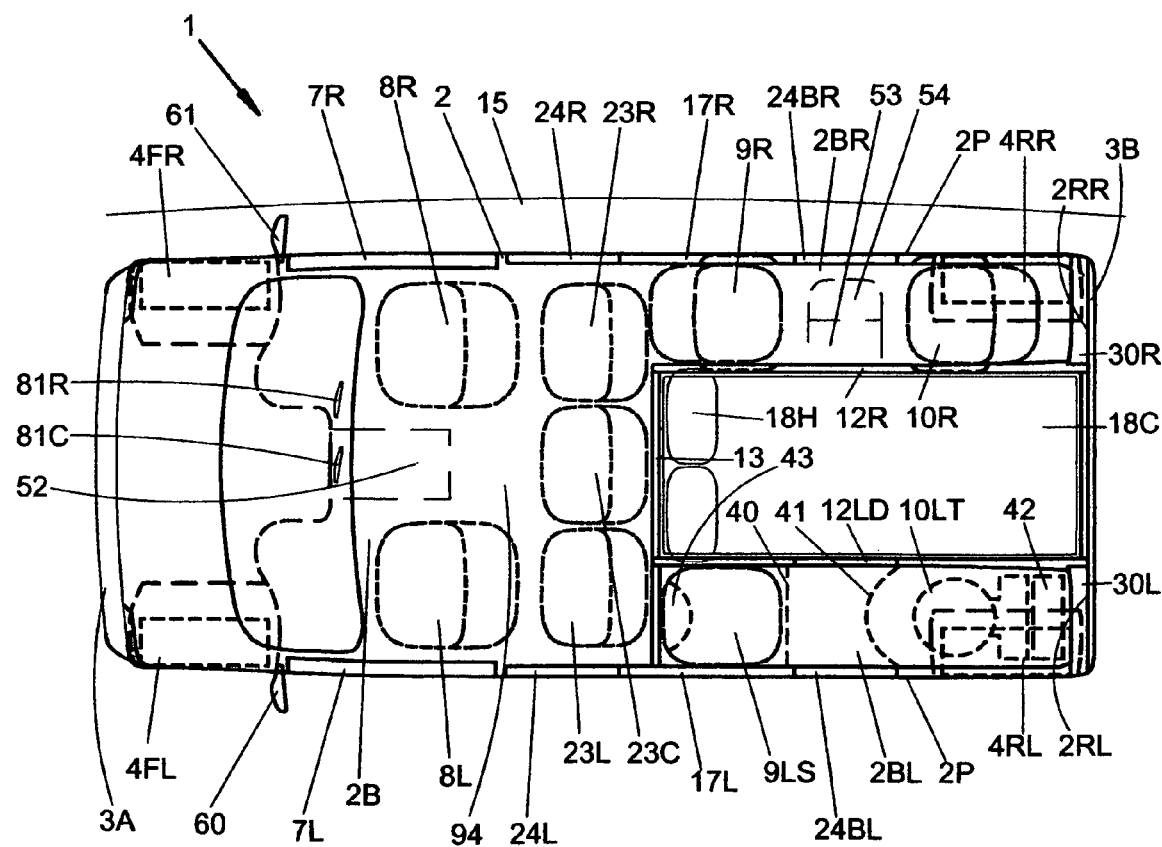
FIG. 7 illustrates an alternate 7 seat embodiment fitted with a bathroom in lieu of a facing-seat zone on one side of the cargo bed.

FIG. 7 illustrates an alternate 7 seat embodiment fitted with a bathroom in lieu of a facing-seat zone on one side of the cargo bed, the left side as illustrated but it could be the right side in a mirror image variant embodiment. In this embodiment the right extension 2BR has a pair of facing seats 9R and 10R, while the left extension 2BL is fitted with a bathroom including a shower area 9LS, a toilet 10LT, a cabinet or bath closet 42, and a fold-down sink 43 shown located in the shower area 9LS (but which sink could be located elsewhere in the bathroom in alternate embodiments). A step-up line 41 is shown to enable the toilet floor to be slightly elevated to accommodate drain plumbing beneath it, while a threshold 41 which may also include a door or curtain is shown at the entry to the shower area 9LS. Preferably the bathroom can be entered either from the cargo bed area which can be used as a camper area 18C, via door 12LD, or from outside the vehicle via door 24BL. The camper area 18C can be fitted with a bed or mattress and with a removable camper top for enclosure when desired, as illustrated. For a representative vehicle that is about 84 inches wide, a bed area can be provided that is about 38 inches wide at the height level of the armrests of seats 9R and 10R, and about 40 or 42 inches wide at the height level of the bed mattress surface, through sidewall contouring as per the illustrated embodiment. Note that all the dimensions cited are merely representative and should not be construed to limit the invention as claimed. Under-bed storage can also be provided, for example through the use of under-pillow access panels 18H. The removable camper top may be of a slide-in-from-the-rear type that slides in and locks in place; and may optionally have under-top and/or over-top storage compartments. The removable camper top may incorporate a sun-roof or moon-roof, or a large transparent top panel with one-way glass or transparency material to permit an occupant to see the sky above, but not permit anyone outside to see into the volume under the camper roof. This embodiment can sleep four people in full-flat configurations, with a couple sleeping in the camper area 18C, and one person in a bed conversion of seats 9R and 10R, and another person in a bed conversion of the seat bottoms of seats 23L, 23C and 23R, which may be combined as a bench seat in a variant embodiment.

FIG. 7 also illustrates a motor vehicle 1 comprising: running gear means (illustrated with four wheels and tires 4FL, 4FR, 4RL and 4RR) for permitting said vehicle to move and maneuver upon a road surface 15; a vehicle body 2 with a substantially enclosed compartment 2B surrounding a driver's seat, said compartment having a side extension (2BR) extending rearwardly to a rear end of one side (2RR) of said body, said side extension having an outer side wall (17R), a rear wall (30R), and an inner side wall (12R), said inner side wall spaced inwardly of an outer perimeter 2P of the body; a pair of facing seats (9R and 10R) located at least in part in said side extension; a rear wheel (4RR) of said running gear means located at least in part below and behind the seat bottom of the aftmost of said pair of facing seats (10R); a roof 94 extending over said enclosed compartment 2B above the driver's seat and above said side extension (2BR); and a cargo bed 18 bounded at a forward edge by a rear wall 13 of said enclosed compartment and at one side edge by said inner side wall (12R).

FIG. 7 further illustrates representative features useful for the vehicle's use for camping purposes. A refrigerator/freezer and storage compartment 52 is shown in the forward cab area between seats 8L and 8R. A fold-down or fixed table 54 is shown between facing seats 9R and 10R, to enable two persons to face each other and converse while playing a game or eating a meal. A compact oven (e.g., microwave oven, convection oven, toaster oven, or combination oven) is also shown in the volume between facing seats 9R and 10R, which may be situated either above or below the table 54 in variant embodiments. Other variant locations for amenities such as refrigeration and storage amenities, cooking and eating amenities, and entertainment amenities (not shown but could include audio-visual devices and flat-screen television displays, as are used in prior art recreational vehicles) can clearly be incorporated in various locations in the vehicle, within the spirit and scope of the invention as defined in the appended claims. Another variant of the FIG. 7 embodiment could feature two stacked bunk beds in lieu of the two seats 9R and 10R in extension 2BR.

FIG. 7 also illustrates a motor vehicle 1, further comprising an inside rearview mirror 81R suitable for use by a driver of said vehicle seated in the driver's seat 8L, which inside rearview mirror 81R is offset laterally from the centerline of said vehicle in a direction laterally opposite to the offset direction of the location of said driver's seat 8L. The illustrated embodiment has two inside rearview mirrors, one central 81C and one offset right 81R to enable the driver to see through the right side windows and right aft window in right extension 2BR, using mirror 81R. The mirrors may be manually or automatically adjustable, and may include preset settings that they can go to automatically to meet the needs of different drivers. In alternate embodiments a single offset mirror may be used instead of two mirrors one of which is central; or two mirrors one offset right and one offset left, or one offset mirror plus a video rearview synthetic mirror. In general, it is a design objective to provide the driver with sufficient rear view and minimal or no blind spots, using a combination of exterior mirrors, interior mirror(s), and aft viewing video means to feed into driver-viewable rearview images whether mirror and/or video display (e.g., flat panel display). Sunshades including a left sunshade, right sunshade and optional 3rd central sunshade, can be configured to locate around whatever inside mirrors are furnished near the top of the forward windshield, to provide means for shading the eyes of a driver and/or occupant from incoming solar rays as and when needed. The sunshades may include left and right sunshades similar to typical hinged automobile sunshades, and may include a central sunshade between two mirror installations, which is a reel down sunshade such as a miniature version of a reel down sunshade found on some commercial vehicles such as tour buses.

Figure 8C:
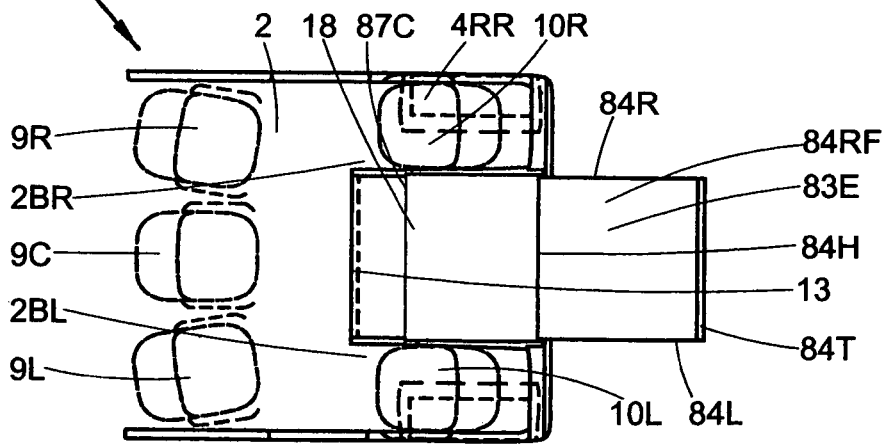

FIGS. 8A, 8B and 8C illustrate embodiments if the invention with cargo bed extenders. For example, a cargo bed extender may be deployed to enable carriage of 8 foot long pieces of lumber which might not fit into a cargo bed with the tailgate closed and no extender, for one representative embodiment of the invention.

FIG. 8A provides a partial plan view illustration of a motor vehicle 1, with deployable pickup bed extension means 83 for permitting deployment of an extended length cargo bed 18E with said extension means in its deployed configuration; wherein said pickup bed extension means 83 includes a two-panel tailgate with a first panel 84F and a second panel 84T, which when undeployed are located adjacently together in a conventional tailgate configuration, and which when deployed (as shown) have a configuration wherein the first panel 84F serves as floor means for a pickup bed extension 18PE, and wherein the second panel 84T serves as a tailgate type of rear closure for the pickup bed extension 18PE.

FIG. 8A further illustrates the motor vehicle 1, further comprising side restraint means 85 comprising at least one of (i) reel-out-and-fasten side restraint sheets for providing lateral restraint to any cargo on the pickup bed extension or (ii) deployable side restraint panels for providing lateral restraint to any cargo on the pickup bed extension 18PE.

FIG. 8B provides a partial plan view illustration of a motor vehicle 1, wherein a deployable pickup bed extension means 83 includes an aftward-translatable member 86 comprising (i) a floor component 86F and (ii) a right sidewall component 86R and (iii) a left sidewall component 86L and (iv) tailgate means 86T for providing an aft load constraint for a load located at least in part in said pickup bed extension means. Powered or manual means may be provided for deployment and retraction of the aftward-translatable member, and tracks and rollers may optionally be utilized. The floor component 86F may slide above (as illustrated) or possibly below the floor of the main part of the pickup or cargo bed 18, with a sliding interface seal of any of a variety of known seal means known from the prior art.

Finally, FIG. 8B also illustrates a motor vehicle 1, further comprising at least one of (i) front distance sensor means (not illustrated) for measuring clearance between a front bumper of the vehicle and the nearest object or obstacle it could hit upon further forward movement of said vehicle, and (ii) rear distance sensor means 87R (illustrated) for measuring clearance between a rear end of the vehicle and the nearest object or obstacle it could hit upon further aft movement of said vehicle. Alternate embodiments could feature vehicle side distance sensors and/or vehicle corner distance sensors. The distance sensor means can feed aural and/or visual data to a driver of the vehicle, such as warning data alerting the driver to brake to avoid an impending collision. One example would be a beeping or distinctive horn sound aural alert, or a synthesized or recorded voice alert.

FIG. 8C provides a partial plan view illustration of a motor vehicle 1, further comprising a fold-out cargo bed extender 83E which when undeployed has a top panel 84T and rear panel 84RF, which convert to a tailgate panel 84T and an extender floor panel 84RF when said fold-out cargo bed extender is deployed (as shown) by rotationally folding it out (around hingeline 84H in the illustrated embodiment). The fold-out cargo bed extender 83E also has sidewalls 84R and 84L included, in the illustrated embodiment, and so acts as an overall fold-down pickup bed assembly to provide the extension when desired by the vehicle's owners or users. The rotational motion may be powered or manual, and locking mechanisms will preferably be provided for the full up and full down configurations. A cargo loading openable access panel may optionally be furnished in the rear panel 84RF, to permit cargo loading onto the cargo bed 18 even when the cargo bed extender 83E is in its up or stowed configuration.

FIG. 8C further illustrates motor vehicle 1, further comprising nonpermanent means 87C for at least one of covering and enclosing the cargo bed 18 on an as-desired basis. A shorter cargo bed 18 is illustrated in this embodiment, with an added rear-facing seat 9C. This same shorter cargo bed and added rear-facing seat can also be implemented on other embodiments within the spirit and scope of the invention. FIG. 8C thus shows a first pair of mutually facing seats 9R and 10R located at least in part in said right extension 2BR and a second pair of mutually facing seats 9L and 10L located at least in part in left extension 2BL. Note that the facing seats are not exactly facing in the illustrated embodiment, and more generally will be defined as facing if the facing directions are within 90 degrees of directly opposite to each other.

Note that the illustrated nonpermanent means 87C utilizes sliding panel means, while alternate nonpermanent means could comprise folding panel means and/or reel-out sheet means, and any of these nonpermanent means may be conceptually similar to those employed in prior-art pickup bed lids or covers. When the cargo bed extender 83E is in its up or stowed configuration, and the nonpermanent means 87 are in their down or covering configuration, the illustrated embodiment will have a fully enclosed and optionally lockable cargo bed volume. In alternate embodiments such as a variant of the embodiment of FIG. 1, a reel out top from the top of rear wall 13 and a slide-up window up from the tailgate 14 could be provided to enable cargo bed enclosure when desired, as for example for camper use of the cargo bed.

In addition to the pickup bed extension embodiments of FIGS. 8A, 8B and 8C, further pickup bed extension concepts from prior-art pickup trucks can also be adapted for inclusion in variant embodiments of the present invention.

Figure 9:
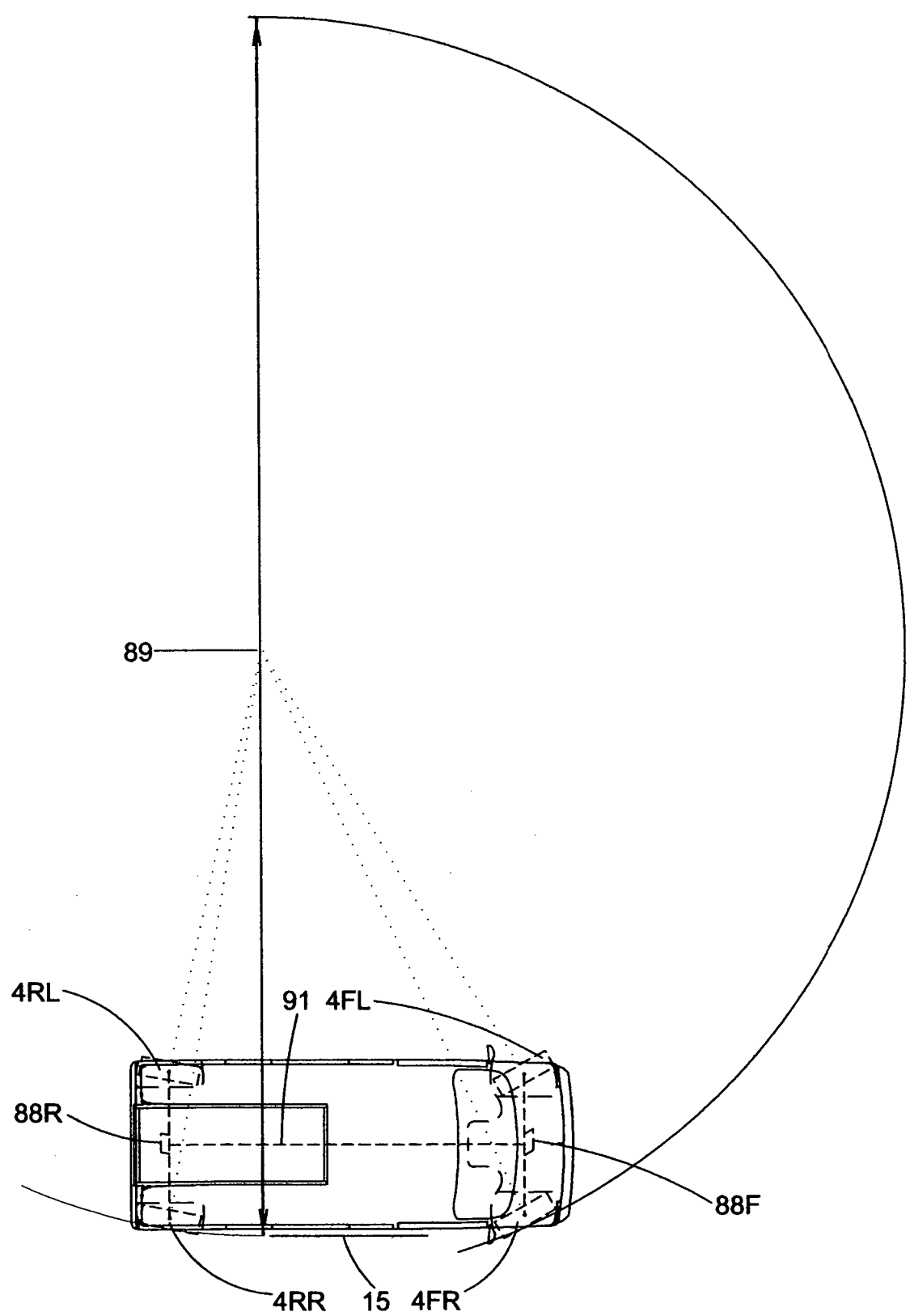
FIG. 9 illustrates an embodiment with added rear wheel steering to reduce turn radius.

FIG. 9 illustrates an embodiment of the invention, similar to that of FIG. 1, with rear wheel steering implemented to reduce turn radius. Seats are not shown in this illustration, to more clearly show the steering aspects of the invention. To address the turning radius issue, one preferred solution is to add some measure of aft wheel and tire steering to supplement the normal substantial steering angle implemented on the front wheels and tires. This is illustrated in FIG. 9, where a 9-seat vehicle of this inventive class, approximately 210 inches long and 82 inches wide, is fitted with some aft steering and is shown able to turn within a representative turn width of approximately 49 feet, corresponding to an effective turning radius of 24.5 feet. This effective turn radius is comparable to that of many exemplary sport-utility vehicles or full-size pickup trucks, and may vary depending on steering stop angles and slip angles. All the numbers cited are representative and should not be presumed to constrain the invention documented herein.

More specifically, FIG. 9 shows motor vehicle 1, further comprising steering means 88F for steering the front wheels of said running gear means for permitting said vehicle to move and maneuver upon a road surface 15; and further comprising supplementary steering means 88R for steering said rear right and rear left wheels 4RR and 4RL of the running gear means; and wherein operation of said supplementary steering means 88R acts to reduce the effective turn radius of said vehicle, where the turn radius is defined as one half of the turn width 89; and wherein the supplementary steering schedule for said supplementary steering means is a function of the steering schedule for said steering means, and/or wherein the supplementary steering schedule for said supplementary steering means is a function of at least one of vehicle speed or the rotational angular speed of at least one wheel in said running gear means.

The embodiment of FIG. 9 also shows the motor vehicle 1, further comprising drive means 91 for driving all the wheels included in said running gear means for permitting said vehicle to move and maneuver upon the road surface 15. This system may be an "all wheel drive" system or a "4 wheel drive" system as are known from the prior art.

Figure 10:
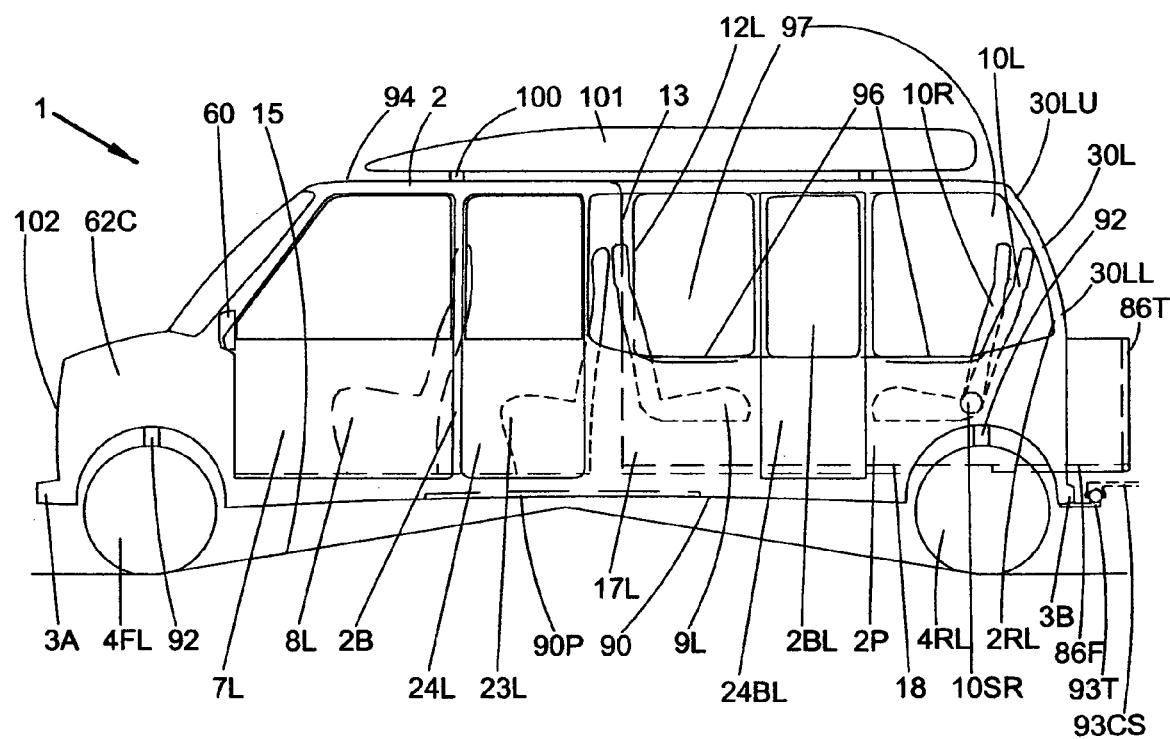
FIG. 10 illustrates an embodiment with increased breakover angle and effective ground clearance relative to the embodiment of FIG. 2.

FIG. 10 illustrates an embodiment of the invention with increased breakover angle and effective ground clearance. The embodiments of FIGS. 1-3 feature location of the rear wheels and tires below and behind the aft seats 10R and 10L in the facing-seat pairs, to enable a low flat floor between the facing-seats and to enable side entry into the compartments housing the facing-seat pairs. This results in a vehicle with a considerably long wheelbase, which is very good for stability but poses an issue for breakover angle in addition to an issue for turning radius which has already been addressed in the context of FIG. 9. The breakover angle issue can be addressed in a straightforward manner by increasing ground clearance under the vehicle especially in the central region approximately midway between the front and rear wheels. For example, a ground clearance of 9 to 11 inches could be used, as opposed to 6 to 8 inches for many comparable automotive vehicles. In addition to or in lieu of overall increased ground clearance, the breakover angle can be increased by contouring the lower surface or "keel line" of the vehicle to be higher in the region midway between the front and rear tires, as shown in the illustrated embodiment in FIG. 10. The FIG. 10 embodiment of the vehicle may have representative dimensions of about 204 inches length, 82 inches width, and 78 inches height (not including the rooftop cargo pod or aft tow fitting), which should not be construed to constrain the invention as claimed.

Thus FIG. 10 shows a motor vehicle 1, further comprising a vehicle keel line 90 between front and rear wheels and tires, which keel line has greater height in a central region approximately midway between the front and rear wheels and tires (4FL and 4RL respectively, visible on the vehicle left side view), relative to its height in the vicinity of the front wheels and tires (4FL visible on the vehicle left side view) and its height in the vicinity of the rear wheels and tires (4RL visible on the vehicle left side view); and wherein said greater height in a central region yields increased breakover angle for said motor vehicle 1.

FIG. 10 also shows motor vehicle 1, further comprising suspension means 92 including at least one of (i) a variable height suspension connecting the body of said vehicle with the wheels included in said running gear means for permitting said vehicle to move and maneuver upon a road surface; or (ii) anti-lean means in the suspension system connecting the body of said vehicle with the wheels included in said running gear means for permitting said vehicle to move and maneuver upon a road surface.

Note that use of a variable height suspension can enable good breakover angles when maneuvering over undulating terrain by raising the suspension relative to a nominal ground clearance value of 6 to 8 inches, for example. In long wheelbase vehicles without a variable height suspension, achieving good breakover angles may also be achieved by using larger ground clearance values of 9 to 11 inches, for example.

FIG. 10 also shows the motor vehicle 1, further comprising protective plate means 90P on the underbody of the vehicle 1, to prevent vehicle damage from ground contact in severe breakover geometry conditions as may be encountered when said road surface lies upon severely undulating terrain.

FIG. 10 also shows the motor vehicle 1, wherein the upper part of the left rear wall 30L is inclined with the upper end 30LU of the left upper part located substantially forward of the location of the lower end 30LL of the left upper part; and correspondingly on the far side of the vehicle in this left side view, wherein the upper part of the right rear wall (30R not visible) is inclined with the upper end (30RU not visible) of the right upper part located substantially forward of the location of the lower end (30RL not visible) of the right upper part.

FIG. 10 also illustrates motor vehicle 1, further comprising seat recline means 10SR for permitting the aftmost seats 10R and 10L of the first and second pairs of facing seats respectively, to be reclined into the regions above said rear right and rear left wheels 4RR and 4RL respectively.

FIG. 10 also illustrates the motor vehicle 1, further comprising an aft tow fitting 93T located below the level of the tailgate means such that said tailgate means do not interfere with said tow fitting 93T or with connecting structure 93CS of a towed entity connecting to said tow fitting, with said tailgate means either open, closed (as shown in FIGS. 1-3) or in a transition volume swept between the open and closed positions, or with a tailgate extender deployed as shown in FIG. 10 and as illustrated earlier in the context of FIGS. 8A, 8B and 8C.

FIG. 10 also illustrates the motor vehicle 1, further comprising at least one (i) rooftop rack means 100 or (ii) rooftop cargo pod means 101 for carrying items above said roof. Note that the rooftop rack means may be located above the enclosed compartment 2B above the driver's seat, and/or above the right extension 2BR and/or above the left extension 2BL, corresponding to locations shown earlier with reference to FIGS. 1-3.

Finally, FIG. 10 also illustrates the motor vehicle 1, further comprising a forward-location engine compartment 62C with branding signature air grille 102 in front of said forward-location engine compartment. The engine compartment may have a hood that is openable, and optionally an aft-hinged hood openable element that also includes said air grille 102, as has been used in some prior-art trucks to provide better engine comapartment access when the hood length is short.

While certain preferred embodiments have been described with reference to FIGS. 1 through 10, it should be understood that further variations and modifications are within the scope of the invention as defined in the following claims.

What is claimed is:

1. A motor vehicle comprising:
    running gear means for permitting said vehicle to move and maneuver upon a road surface;
    a vehicle body with a substantially enclosed compartment surrounding a driver's seat, said compartment having a right extension extending rearwardly to a rear end of the right side of said body, said right extension having a right outer side wall, a right rear wall, and a right inner side wall, said right inner side wall spaced inwardly of an outer perimeter of the body, and said compartment having a left extension extending rearwardly to a rear end of the left side of said body, said left extension having a left outer side wall, a left rear wall, and a left inner side wall, said left inner side wall spaced inwardly of an outer perimeter of the body;
    a first pair of mutually facing seats located at least in part in said right extension and a second pair of mutually facing seats located at least in part in said left extension;
    a rear right wheel of said running gear means located at least in part below and behind the seat bottom of the aftmost of said first pair of mutually facing seats;
    a rear left wheel of said running gear means located at least in part below and behind the seat bottom of the aftmost of said second pair of mutually facing seats;
    a roof extending over said enclosed compartment above the driver's seat and above said right extension and above said left extension; and
    a cargo bed bounded at a forward edge by a rear wall of said enclosed compartment and at a first side edge by said right inner side wall and at a second side edge by said left inner side wall.

2. A motor vehicle comprising:
    running gear means for permitting said vehicle to move and maneuver upon a road surface which running gear means includes two front wheels and tires and two rear wheels and tires;
    a vehicle body with a substantially enclosed compartment surrounding a driver's seat, said compartment having a right extension extending rearwardly to a rear end of the right side of said body, said right extension having a right outer side wall, a right rear wall, and a right inner side wall, said right inner side wall spaced inwardly of an outer perimeter of the body, and said compartment having a left extension extending rearwardly to a rear end of the left side of said body, said left extension having a left outer side wall, a left rear wall, and a left inner side wall, said left inner side wall spaced inwardly of an outer perimeter of the body;

a right aftmost seat located at least in part in said right extension and a left aftmost seat located at least in part in said left extension;

a right extension access door located in said right outer side wall in major part forward of said right aftmost seat, and a left extension access door located in said left outer side wall in major part forward of said left aftmost seat;

wherein said rear wheels and tires of said running gear means are located at least in part below and behind the seat bottoms of said right aftmost seat and said left aftmost seat respectively, and wherein said rear wheels and tires are located with their aftmost ends located less than 1.4 tire diameter from the aftmost end of a rear bumper of said motor vehicle;

a roof extending over said enclosed compartment above the driver's seat and above the right extension and above the left extension; and a cargo bed bounded at a forward edge by a rear wall of said enclosed compartment and at one side edge by said right inner side wall and at a second side edge by said left inner side wall.

3. A motor vehicle comprising:

running gear means for permitting said vehicle to move and maneuver upon a road surface;

a vehicle body with a substantially enclosed compartment surrounding a driver's seat, said compartment having a side extension extending rearwardly to a rear end of one side of said body, said side extension having an outer side wall, a rear wall, and an inner side wall, said inner side wall spaced inwardly of an outer perimeter of the body;

a pair of facing seats located at least in part in said side extension;

a rear wheel of said running gear means located at least in part below and behind the seat bottom of the aftmost of said pair of facing seats;

a roof extending over said enclosed compartment above the driver's seat and above said side extension; and a cargo bed bounded at a forward edge by a rear wall of said enclosed compartment and at one side edge by said inner side wall.

4. The motor vehicle of claim 1, wherein said right outer side wall and left outer side wall utilize thin but strong structure means in areas adjacent to where the hips, arms and shoulders of occupants of said first pair and second pair of facing seats are located, which thin but strong structure means serve as means for enabling wider seating comfort for said occupants given specified overall vehicle width and cargo bed width.

5. The motor vehicle of claim 4, wherein at least one of (i) said right outer side wall and left outer side wall utilize strong structure means with lateral impact protection means in areas in the vicinity of the vertical level corresponding to where the feet of occupants of said first pair and second pair of facing seats are located; and (ii) said right outer side wall and left outer side wall utilize thin but strong and shatter-resistant transparent window means in areas adjacent to where the shoulders of occupants of said first pair and second pair of facing seats are located, with outboard armrest surfaces built into the lower sill surfaces of said transparent window means, for said occupants to rest their outboard-side arms.

6. The motor vehicle of claim 1, wherein said driver's seat is either (i) on the left side of said substantially enclosed compartment or (ii) on the right side of said substantially enclosed compartment; and further comprising left and right forward door means for permitting entry into and egress from said substantially enclosed compartment for occupants of said driver's seat and of a forward passenger seat laterally disposed on the opposite side of said vehicle relative to said driver's seat.

7. The motor vehicle of claim 1, further comprising right and left second door means for permitting entry into and egress from said substantially enclosed compartment for occupants of a second row of seats disposed in a row longitudinally located behind said driver's seat.

8. The motor vehicle of claim 1, wherein said first pair of facing seats comprise a forward-facing aftmost right seat and an aft-facing second to aftmost right seat and wherein said second pair of facing seats comprise a forward-facing aftmost left seat and an aft-facing second to aftmost left seat.

9. The motor vehicle of claim 1, further comprising right aft door means located in said right outer side wall for permitting entry into and egress from said right extension for occupants of said first pair of facing seats, and further comprising left aft door means located in said left outer side wall for permitting entry into and egress from said left extension for occupants of said second pair of facing seats.

10. The motor vehicle of claim 1, further comprising either (i) rear right door means located in said right rear wall for permitting goods to be loaded into said right extension behind said first pair of facing seats and rear left door means located in said left rear wall for permitting goods to be loaded into said left extension behind said second pair of facing seats, or (ii) rear right hatch means located in an upper substantially transparent window panel in the right upper part of said right rear wall for permitting goods to be loaded into said right extension behind said first pair of facing seats and rear left hatch means located in an upper substantially transparent window panel in the left upper part of said left rear wall for permitting goods to be loaded into said left extension behind said second pair of facing seats.

11. The motor vehicle of claim 1, wherein said upper part of said right rear wall is inclined with the upper end of the right upper part located substantially forward of the location of the lower end of the right upper part and wherein said upper part of said left rear wall is inclined with the upper end of the left upper part located substantially forward of the location of the lower end of the left upper part.

12. The motor vehicle of claim 1, further comprising seat recline means for permitting the aftmost seats of said first and second pairs of facing seats respectively, to be reclined into the regions above said rear right and rear left wheels respectively.

13. The motor vehicle of claim 1, further comprising openable tailgate means located at the aft end of said cargo bed.

14. The motor vehicle of claim 13, further comprising an aft tow fitting located below the level of said tailgate means such that said tailgate means do not interfere with said tow fitting or with connecting structure of a towed entity connecting to said tow fitting, with said tailgate means either open, closed or in a transition volume swept between the open and closed positions.

15. The motor vehicle of claim 1, with deployable pickup bed extension means for permitting deployment of an extended length cargo bed with said extension means in its deployed configuration.

16. The motor vehicle of claim 15, wherein said pickup bed extension means includes a two-panel tailgate with a first panel and a second panel, which when undeployed are located adjacently together in a conventional tailgate configuration, and which when deployed have a configuration wherein the first panel serves as floor means for a pickup bed extension, and wherein the second panel serves as a tailgate type of rear closure for the pickup bed extension; and further comprising side restraint means comprising at least one of (i) reel-out-and-fasten side restraint sheets for providing lateral restraint to any cargo on the pickup bed extension and (ii) deployable side restraint panels or bars for providing lateral restraint to any cargo on the pickup bed extension.

17. The motor vehicle of claim 15, wherein said deployable pickup bed extension means includes an aftward-translatable member comprising (i) a floor component and (ii) a right sidewall component and (iii) a left sidewall component and (iv) tailgate means for providing an aft load constraint for a load located at least in part in said pickup bed extension means.

18. The motor vehicle of claim 1, further comprising deployable protective means for protecting said right inner side wall and any window element therein, said left inner side wall and any window element therein, and said rear wall of said enclosed compartment and any window element therein, from surface damage by movement of cargo located on said cargo bed.

19. The motor vehicle of claim 1, further comprising at least one of (i) cargo load securing means located near the top end of the rear wall of the enclosed compartment, (ii) tailgate cargo load securing means, (iii) cargo load securing means located near the top end of said right inner side wall of said enclosed compartment, and (iv) cargo load securing means located near the top end of said left inner side wall of said enclosed compartment, for enabling securing of cargo loads on the cargo bed.

20. The motor vehicle of claim 1, further comprising non-permanent means for at least one of covering and enclosing said cargo bed on an as-desired basis.

21. The motor vehicle of claim 1, further comprising at least one (i) rooftop rack means and (ii) rooftop cargo pod means for carrying items above said roof.

22. The motor vehicle of claim 8, further comprising at least one of (i) storage means for storing items immediately forward of the aft-facing second to aftmost right seat, below the level of the top of the seatback of the aft-facing second to aftmost right seat; (ii) storage means for storing items immediately forward of the aft-facing second to aftmost left seat, below the level of the top of the seatback of the aft-facing second to aftmost left seat; (iii) storage means for storing items immediately aft of the forward-facing aftmost right seat; and (iv) storage means for storing items immediately aft of the forward-facing aftmost left seat.

23. The motor vehicle of claim 1, further comprising a storage compartment in said cargo bed; and optionally further comprising means for retracting the structure of said storage compartment to a configuration occupying less space in said cargo bed.

24. The motor vehicle of claim 1, further comprising means for longitudinally repositioning said rear wall of said enclosed compartment, and for changing the length of said cargo bed concurrently.

25. The motor vehicle of claim 1, further comprising at least one of (i) means for laterally repositioning said right inner side wall of said enclosed compartment, and for changing the width of said cargo bed concurrently; and (ii) means for laterally repositioning said left inner side wall of said enclosed compartment, and for changing the width of said cargo bed concurrently.

26. The motor vehicle of claim 25, with at least one of (i) means for folding the seat back and seat bottom elements of said first pair of facing seats to enable repositioning of said right inner side wall to a further right location so as to enable an effectively wider cargo bed width when said first pair of facing seats need not be used for seating occupants; and (ii) means for folding the seat back and seat bottom elements of said second pair of facing seats to enable repositioning of said left inner side wall to a further left location so as to enable an effectively wider cargo bed width when said second pair of facing seats need not be used for seating occupants.

27. The motor vehicle of claim 25, with at least one of (i) telescopic contracting member means for reducing the effective width of said first pair of facing seats to enable repositioning of said right inner side wall to a further right location so as to enable an effectively wider cargo bed width when said first pair of facing seats need not be used for seating occupants; and (ii) telescopic contracting member means for reducing the effective width of said second pair of facing seats to enable repositioning of said left inner side wall to a further left location so as to enable an effectively wider cargo bed width when said second pair of facing seats need not be used for seating occupants.

28. The motor vehicle of claim 1, further comprising drive means for driving all the wheels included in said running gear means for permitting said vehicle to move and maneuver upon a road surface.

29. The motor vehicle of claim 1, further comprising at least one of (i) a vehicle keel line between front and rear wheels and tires, which keel line has greater height in a central region approximately midway between the front and rear wheels and tires, relative to its height in the vicinity of the front wheels and tires and its height in the vicinity of the rear wheels and tires, and wherein said greater height in a central region yields increased breakover angle for said motor vehicle; and (ii) protective plate means on the underbody of said vehicle, to prevent vehicle damage from ground contact in severe breakover geometry conditions as may be encountered when said road surface lies upon severely undulating terrain.

30. The motor vehicle of claim 1, further comprising suspension means including at least one of (i) a variable height suspension connecting the body of said vehicle with the wheels included in said running gear means for permitting said vehicle to move and maneuver upon a road surface; and (ii) anti-lean means in the suspension system connecting the body of said vehicle with the wheels included in said running gear means for permitting said vehicle to move and maneuver upon a road surface.

31. The motor vehicle of claim 1, further comprising steering means for steering the front wheels of said running gear means for permitting said vehicle to move and maneuver upon a road surface; and further comprising supplementary steering means for steering said rear right and rear left wheels of said running gear means, wherein operation of said supplementary steering means acts to reduce the effective turn radius of said vehicle, and wherein the supplementary steering schedule for said supplementary steering means is a function of at least one of (i) the steering schedule for said steering means, (ii) vehicle speed, and (iii) the rotational angular speed of at least one wheel in said running gear means.

32. The motor vehicle of claim 1, further comprising driver-controllable foldable external mirror housing means for enabling reduced vehicle overall width to facilitate parking in width-constrained locations.

33. The motor vehicle of claim 1, further comprising at least one of (i) front distance sensor means for measuring clearance between a front bumper of the vehicle and the nearest object or obstacle it could hit upon further forward movement of said vehicle, and (ii) rear distance sensor means for measuring clearance between a rear end of the vehicle and the nearest object or obstacle it could hit upon further aft movement of said vehicle.

34. The motor vehicle of claim 1, further comprising at least one of (i) an inside rearview mirror suitable for use by a driver of said vehicle seated in said driver's seat, which inside rearview mirror is offset laterally from the centerline of said vehicle in a direction laterally opposite to the offset direction of the location of said driver's seat; and (ii) aft facing video camera means with video display means visible to a driver in said driver's seat.

35. The motor vehicle of claim 1, further comprising a forward-location engine compartment with branding signature air grille in front of said forward-location engine compartment.

36. The motor vehicle of claim 1, further comprising a forward-location engine compartment, wherein the engine compartment aft wall moves aft into a zone substantially located laterally between said driver's seat and a forward passenger seat on the opposite side of said vehicle as said driver's seat.

37. The motor vehicle of claim 1, wherein said substantially enclosed compartment includes at least one of (i) a first row of 2 forward facing seats including said driver's seat or a first row of 3 forward facing seats including said driver's seat; and (ii) a second row of 3 forward facing seats longitudinally located behind said driver's seat.

38. The motor vehicle of claim 1, wherein at least one seat located in said substantially enclosed compartment and not located in the same seat row as said driver's seat, is equipped with LATCH means for securing a child seat thereon.

39. The motor vehicle of claim 1, further comprising at least one of audio and video intercommunication means for at least two occupants seated in said enclosed compartment including said right extension and said left extension, to at least one of aurally and visually communicate with one another.

40. The motor vehicle of claim 1, further comprising a fold-out cargo bed extender which when undeployed has a top panel and rear panel, which convert to a tailgate panel and an extender floor panel when said fold-out cargo bed extender is deployed by rotationally folding it out.

* * * * *